United States Patent
Zhang et al.

(10) Patent No.: US 8,485,778 B2
(45) Date of Patent: Jul. 16, 2013

(54) ROTATABLE VANED NOZZLE FOR A RADIAL INFLOW TURBINE

(75) Inventors: Lili Zhang, West Hartford, CT (US); Bruce P. Biederman, Old Greenwich, CT (US); Steven A. Lozyniak, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 840 days.

(21) Appl. No.: 12/696,536

(22) Filed: Jan. 29, 2010

(65) Prior Publication Data
US 2011/0189001 A1 Aug. 4, 2011

(51) Int. Cl.
*F01D 9/02* (2006.01)

(52) U.S. Cl.
USPC ............................. 415/164; 415/163; 415/165

(58) Field of Classification Search
USPC .......................................... 415/163, 164, 165
See application file for complete search history.

(56) References Cited

U.S. PATENT DOCUMENTS

| | | | | |
|---|---|---|---|---|
| 3,495,921 | A * | 2/1970 | Swearingen | 415/163 |
| 4,264,270 | A | 4/1981 | Geary, Jr. | |
| 4,629,396 | A * | 12/1986 | Lorett | 415/164 |
| 5,851,104 | A * | 12/1998 | Dakin et al. | 415/150 |
| 7,254,949 | B2 | 8/2007 | Brasz et al. | |
| 7,281,379 | B2 | 10/2007 | Brasz | |
| 7,393,179 | B1 | 7/2008 | Kesseli et al. | |
| 7,458,764 | B2 | 12/2008 | Lombard et al. | |
| 8,231,339 | B2 * | 7/2012 | Yoshinaga et al. | 415/150 |
| 2007/0277527 | A1 | 12/2007 | Brasz | |

* cited by examiner

*Primary Examiner* — Ninh H Nguyen
(74) *Attorney, Agent, or Firm* — Miller, Matthias & Hull LLP

(57) ABSTRACT

A variable nozzle system can comprise a gas inlet ring, an opposing gas outlet ring, an actuation ring, guides, and vanes circumferentially spaced about and disposed between the gas inlet ring and the gas outlet ring. The gas inlet ring, the gas outlet ring, and the vanes can form nozzles, the nozzles being variable by rotation of the vanes about a pivot axis. The plurality of guides can extend from the gas inlet ring, the gas outlet ring, or the actuation ring, and the vanes can be connected to the actuation ring, so that each vane can be rotated by rotation of the actuation ring and by sliding against a respective guide from the plurality of guides. The actuation ring can have a gear rack and can be rotated by rotatable engagement of the gear rack with a pinion attached to the end of a rotatable gear shaft.

20 Claims, 4 Drawing Sheets

ROTATABLE VANED NOZZLE FOR A RADIAL INFLOW TURBINE

FIELD OF THE INVENTION

This invention relates generally to radial inflow turbines, and more particularly, to a variable vaned nozzle system for such turbines.

BACKGROUND OF THE INVENTION

A radial turbine is a practical device for converting influent (e.g. gas) pressure and temperature to shaft power. A radial inflow turbine employs an annular inlet surrounding a turbine wheel through which the influent under pressure is directed. To uniformly distribute the influent, vanes are disposed about the annular inlet to create nozzles. Many radial inflow turbines incorporate fixed geometry nozzle vanes, or airfoils, in an attempt to optimally guide the influent entering the rotor. In such cases the principal flow parameters, such as pressure, mass flow rate, and temperature remain in fixed proportion, and cannot be individually controlled. A variable nozzle provides an additional degree of control freedom, permitting independent control over inlet temperature, pressure, and flow through the turbine stage.

These variable nozzles are often variable through the controlled pivotal motion of the vanes. Changing the stagger angle alters the throat between the vanes and changes the flow angle entering the rotor. The pivotal vanes are typically mounted between mounting rings which are positioned in a housing to either side of the annular inlet. In one example, the vanes are rotated by a series of horizontal and vertical wheels strung together on a cable. One wheel is rotated by a motor shaft connected to a motor. This one wheel, in turn, rotates each other wheel by drawing the cable clockwise or counterclockwise around each wheel. The vanes can rotate, for instance, by being connected to the axis of the wheels that rotate in a plane parallel with the plane of the mounting ring.

In another device, each vane is attached to a rod which is positioned perpendicular to the influent flow direction. The rods, in a circumferential array, protrude through a movable annular back-wall, and are rotated by a linkage. The vanes in this assembly are adjusted in discrete movements.

These types of nozzle systems are bulky, with many duplicate parts required to adjust the vanes. The bulkiness or clumsiness of these assemblies can be problematic. The additional parts and more complicated assemblies add to the manufacturing and assembly costs. Also, with the bulky, duplicate parts, sealing the influent flow paths to increase or maintain influent pressure and velocity through the nozzles can be difficult and complicated, or it can add further to the bulkiness. Each opening from the influent flow path that accommodates a part necessary for the vane adjustment is an opening that must be sealed. Duplicate parts create additional areas that need to be sealed Furthermore, these systems are limited or devoid in their adaptability for use with various existing radial inflow turbines because the parts are not easily repositioned or resized to accommodate differently configured or differently sized turbines.

It would be advantageous to eliminate or reduce duplicate parts or simplify the nozzle adjustment mechanism.

It would be advantageous to simplify the sealing arrangements and increase the sealing integrity, efficiency, or durability.

It would be advantageous to lower costs associated with component manufacturing and system assembly.

It would be advantageous to provide a nozzle assembly that can be easily adapted for use with a variety of existing radial inflow turbines.

SUMMARY OF THE INVENTION

In one embodiment of the invention, a nozzle assembly for adjusting a radial inflow turbine is provided. The nozzle assembly can comprise a gas inlet ring, a gas outlet ring, an actuation ring, a plurality of guides, and a plurality of nozzle vanes. The gas outlet ring can be spaced apart from the gas inlet ring and the gas outlet ring can oppose the gas inlet ring. The actuation ring can have a central axis about which the actuation ring is rotatable with respect to the inlet ring and the outlet ring. The plurality of guides can be connected to at least one of the gas inlet ring, the gas outlet ring, and the actuation ring. The plurality of nozzle vanes can be circumferentially spaced and disposed between the gas inlet ring and the gas outlet ring, with each nozzle vane rotatable about a vane pivot axis with respect to the gas inlet ring and the gas outlet ring, and each nozzle vane in sliding engagement with a respective guide from the plurality of guides.

In another embodiment of the invention, a variable nozzle system for a radial inflow turbine is provided. The variable nozzle system can comprise a first mounting ring, a second mounting ring, a plurality of vanes, a plurality of nozzles, an actuation ring, a gear rack, and a gear shaft. The second mounting ring can be spaced apart from the first mounting ring and the second mounting ring can oppose the first mounting ring. The plurality of vanes can be circumferentially spaced between the first mounting ring and the second mounting ring, and each vane can have a pivot point around which each vane is rotatable to adjust a plurality of nozzles. Each nozzle in the plurality of nozzles can be defined on four sides by the first mounting ring, the second mounting ring, and two vanes from the plurality of vanes. The actuation ring can have a central axis about which the actuation ring is rotatable with respect to the first mounting ring and the second mounting ring. The actuation ring can also be engaged with each nozzle vane from the plurality of nozzle vanes to drive the rotation of each nozzle vane. The gear rack can be attached to the actuation ring. The gear shaft can extend through the second mounting ring and can have a pinion engageable with the gear rack.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Referring now to the various figures of the drawings, there is illustrated one embodiment of the present invention. In referring to the various figures, like numerals shall refer to like parts.

Figure 1:
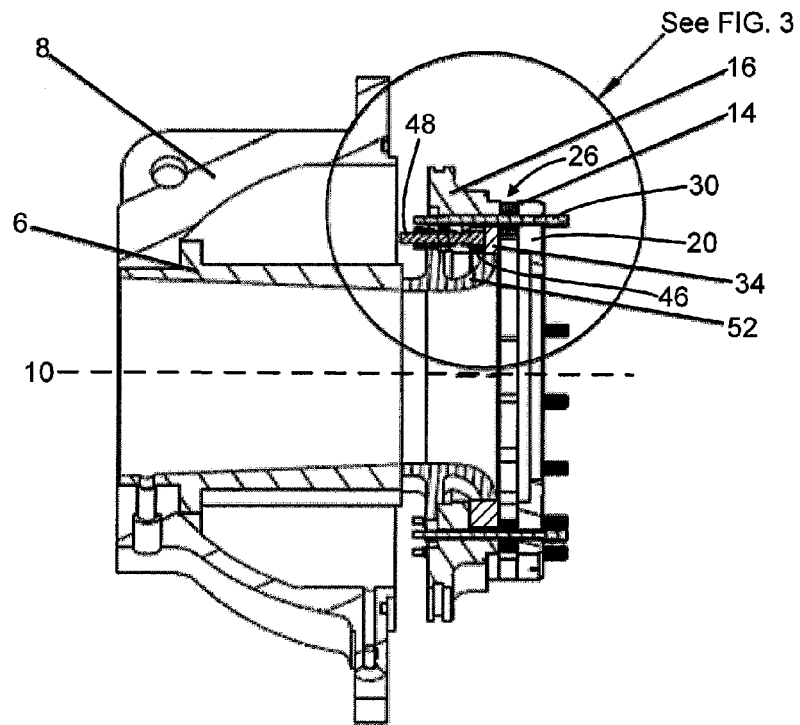
FIG. 1 is a sectioned view of a nozzle assembly according to one embodiment of the invention.
Figure 2:
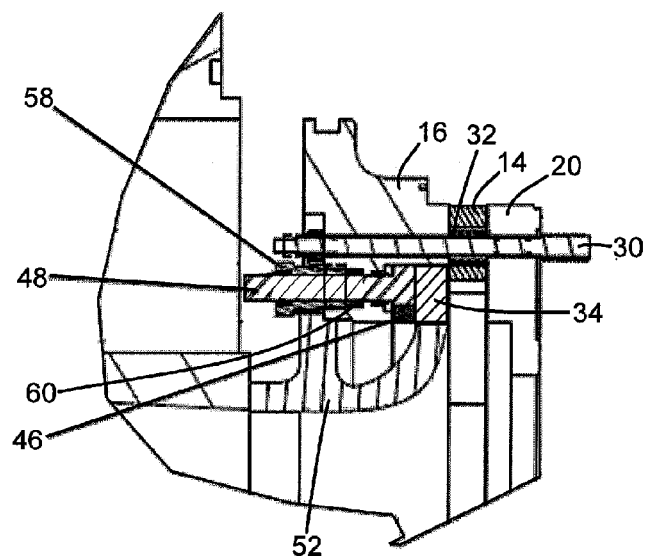
FIG. 2 is a detailed view of the sectioned view of FIG. 1.

FIG. 1 depicts a cross-section of a nozzle assembly 12 used with a radial inflow turbine. FIG. 2 is a detailed view of the embodiment depicted in FIG. 1 highlighting one vane 14 and one adjustable nozzle 26. Referring to FIG. 1 and FIG. 2, the nozzle assembly 12 can be connected as part of the radial inflow turbine, and the radial inflow turbine can be used with an alternator (not shown) or another type of generator (not shown). The alternator or generator is typically used to convert energy from expanding influent to electrical power. The influent is typically a gas, though it could be one from a variety of fluids. The influent, at a high-temperature and a high-pressure, accelerates from the periphery of an inlet ring 20 and an outlet ring 16, into the nozzle assembly 12, directed by adjustable vanes 14, with a tangential vector, toward a turbine rotor (4, see FIG. 4). A velocity vector of the influent, the mass flow rate of the influent, as well as intensive state properties of the influent such as temperature and pressure, influence the potential energy converted to shaft power, as the rotating turbine is connected to a shaft. The lowered pressure and lowered temperature influent exits the nozzle assembly 12 through the outlet ring 16, a shroud 52, and a diffuser 6. The diffuser 6 is internal to a suction housing 8. Electrical power converted by the alternator (not shown) can be connected to a load with conventional wiring.

Figure 3:
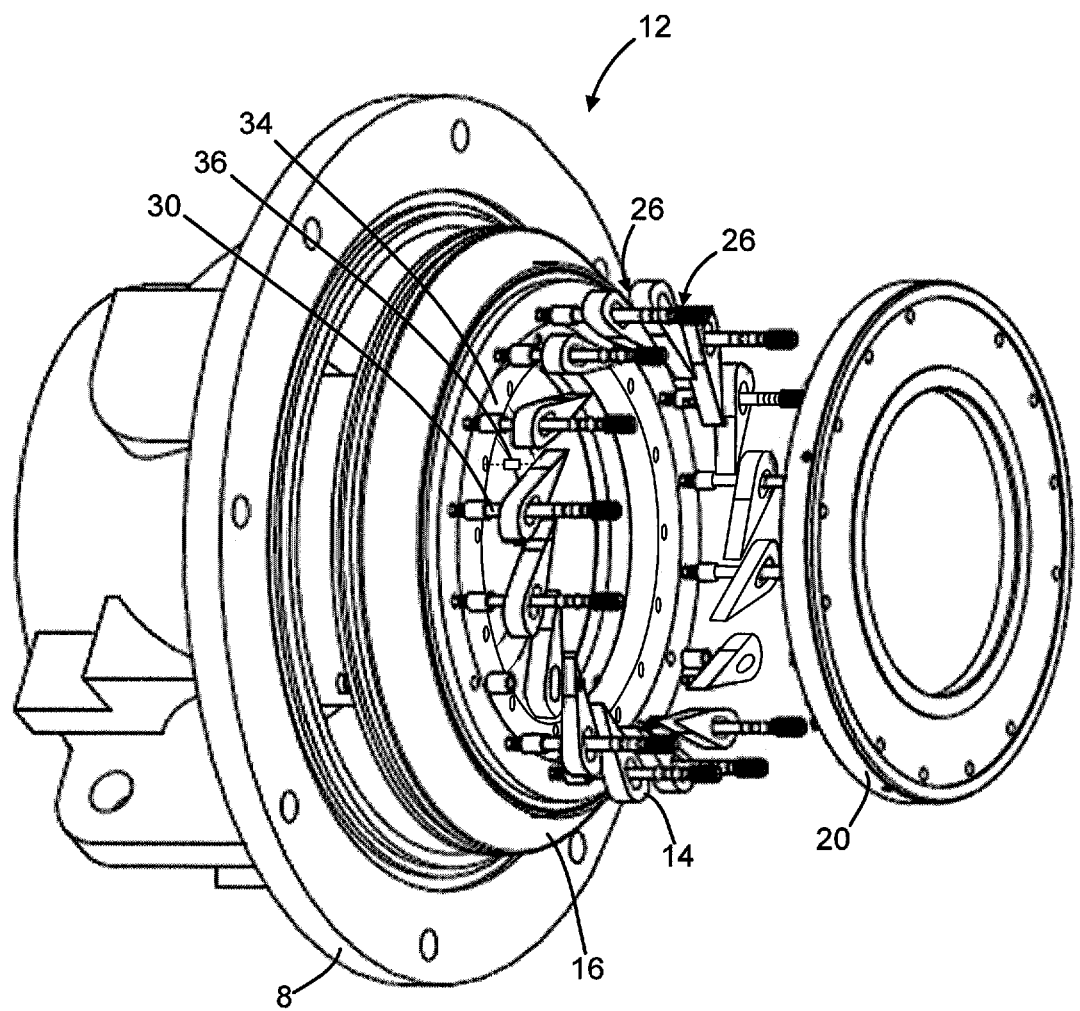
FIG. 3 is a partially exploded perspective view of the nozzle assembly according to one embodiment of the invention.

FIG. 3 is a partially exploded perspective view of the nozzle assembly 12 according to one embodiment of the invention. Referring to the partially exploded view of FIG. 3, the vanes 14 surround the turbine rotor 4 (see FIG. 4) in a circumferential array. The vanes 14 are adjustably angled to direct the flow of influent into the rotor with a high degree of tangency. The number of vanes 14 in the nozzle assembly 12 typically varies from 11 to 19, although other numbers of vanes 14 are conceived and can be used. In the exemplary embodiment illustrated in the figures, 16 vanes 14 are depicted. Turning away from the partially exploded view of FIG. 1, and turning momentarily to FIG. 2 and FIG. 3, each vane 14 is positioned between the outlet ring 16 and an inlet ring 20, creating an adjustable nozzle 26 in the space between each vane, the space bounded as well by the inlet ring 20 and the outlet ring 16.

Figure 6:
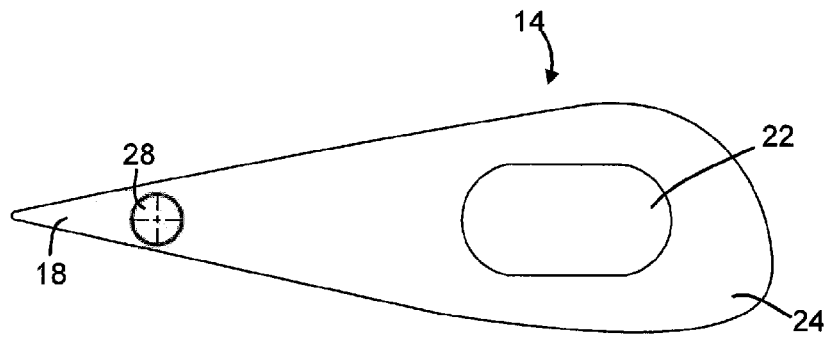
FIG. 6 illustrates an adjustable vane according to one embodiment of the invention.
Figure 7:
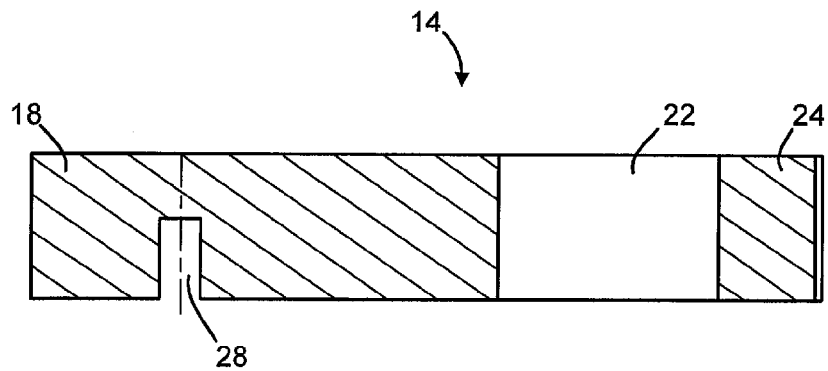
FIG. 7 is a sectioned side view of the vane illustrated in FIG. 6.

FIG. 6 illustrates an adjustable vane 14 according to one embodiment of the invention, and FIG. 7 is a sectioned side view of the vane 14 illustrated in FIG. 6. Referring to FIG. 6 and FIG. 7, each vane 14 can have a slot 22, approximately in a head end 24. The slot 22 can extend completely through the width of the vane 14, or the slot 22 can extend only partially through the width of the vane 14. Each vane also has a bore or hole 28 in a tail end 18. The hole 28 can accept a pin, bolt, screw, or another similar fastening or pivoting device. The shape of the vanes 14 can vary from the shape illustrated in FIG. 6 and FIG. 7, as necessary to achieve desirable influent flow parameters.

Referring again to FIG. 1 and FIG. 2, through each slot 22 extends a guide 30. The illustrated guide 30 is a pin or bolt. Each guide 30 is secured to either the inlet ring 20 on one side of its respective vane 14, or to the outlet ring 16 on the opposite side of its respective vane 14. Each guide 30 can also be secured to both the inlet ring 20 and the outlet ring 20, as shown. Each vane 14 can move (e.g. rotate) so that the slot 22 of each vane slides, guided by each respective guide 30. While each guide 30 illustrated is a pin, other alternative guides 30 are conceived. For instance, one or more rails or posts can extend or project from the inlet ring, the outlet ring, or the actuation ring, into the slot 22 or between vanes 14, and guide the rotation of each respective vane 14.

One or more of the guides 30 can be a bolt 30 to fasten the inlet ring 20 to the outlet ring 16, with the vanes 14 in between the inlet ring 20 and the outlet ring 16. In the illustrated embodiment, three of the guides 30 are bolts 30. The bolts 30 can be double headed or of another variety suitable to fasten securely to one or both of the inlet ring 20, the outlet ring 16, or another stationary structure within the nozzle assembly 12. The bolts 30, or other bolts used in the assembly, and the position of these bolts can be adapted for use with various existing turbines. For instance, the illustrated embodiment can be modified to use bolts that preexist in various, existing turbines as the bolts 30, pins 30, or other fastening or pivoting devices.

A spacer 32 can be used around each guide pin 30 in each slot 22 in order to provide the appropriate clearance between the inlet ring 20 and the outlet ring 16 so that the vane 14 can move in a plane parallel to the plane of the inlet ring 20 and the outlet ring 16. If the appropriate dimensional clearance between the inlet ring 20 and outlet ring 16 is not maintained when the vanes 14 are to be moved, then the vanes 14 might be squeezed between the inlet ring 20 and the outlet ring 16, creating excessive friction that can obstruct proper movement of the vanes 14. Other mechanisms known in the art can also be used to create a permanent or temporary clearance between the vanes 14 and the inlet ring 20, and/or between the vanes 14 and the outlet ring 16, so that the vanes 14 can move when actuated.

Figure 4:
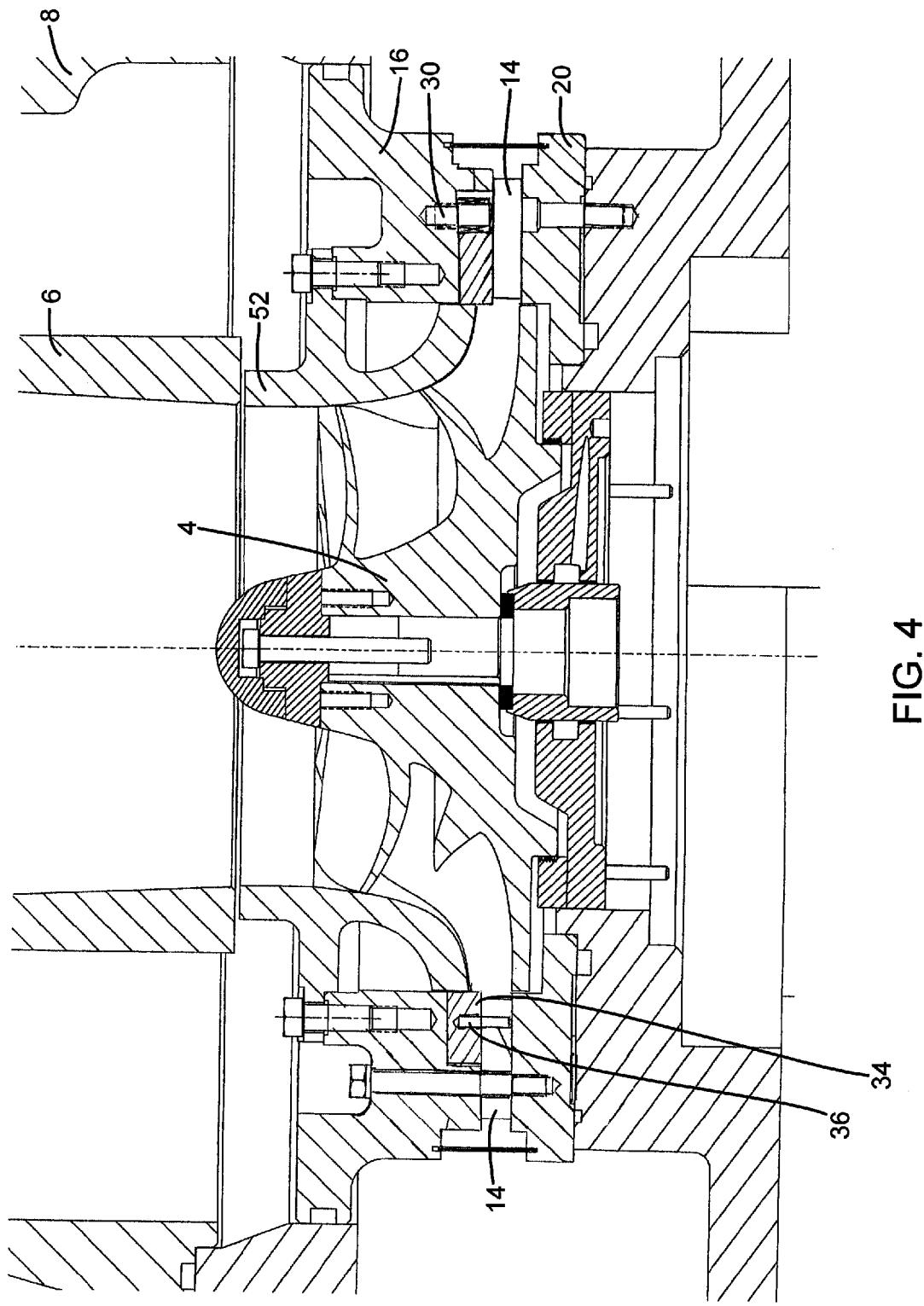
FIG. 4 is sectioned view of a nozzle assembly according to one embodiment of the invention.

FIG. 4 is a sectioned view of the nozzle assembly 12 according to one embodiment of the invention. Referring to FIG. 4, as well as FIG. 3, the vanes 14 are actuated, in part, by a connection with an actuation ring 34. A pivot pin 36 can extend from the hole 28 of each vane to the actuation ring 34. Each pivot pin 36 has a center axis about which each respective vane 14 rotates. The actuation ring 34 can be locted or sized otherwise in other embodiments, for instance, to accommodate use of the nozzle assembly 12 with various, existing turbines.

Figure 5:
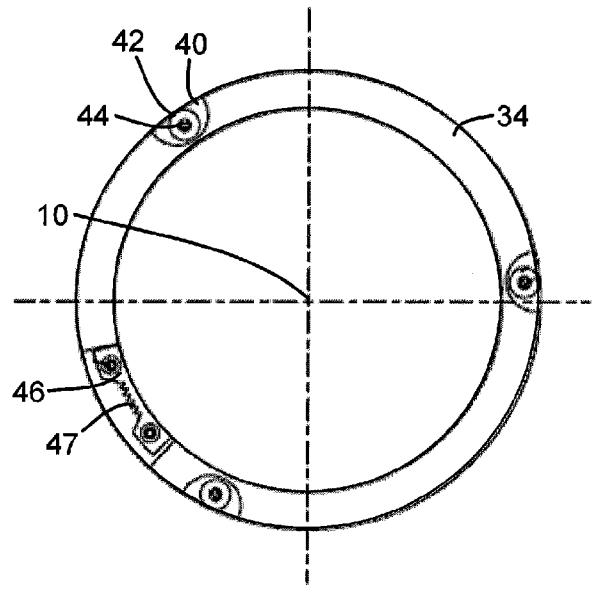
FIG. 5 illustrates an actuation ring, a gear rack, and rollers according to one embodiment of the invention.

FIG. 5 illustrates the actuation ring 34, a gear rack 46, and rollers 42 according to one embodiment of the invention. Referring to FIG. 5, the illustrated actuation ring 34 has three cutout sections 40, with one roller 42 positioned in each cutout section 40 to guide and stabilize the rotational movement of the actuation ring 34. Each roller 42 rotates about a roller bolt or roller pin 44 which is secured to the actuation ring 34. This embodiment can be modified depending on the position of the actuation ring 34.

The actuation ring 34 also has, or is connected to, the gear rack 46. The gear rack 46 has gear rack teeth 47 which fit with similar gear shaft teeth (not shown) on an end of a gear shaft 48 (see FIG. 1 and FIG. 2). A fine match between the gear rack teeth 47 and the gear shaft teeth (not shown) enables fine adjustment of the vanes 14.

Referring again to FIG. 1 and FIG. 2, the gear shaft 48 extends through the outlet ring 16, where the gear shaft 48 can be connected to and operated by (e.g. rotated about an axis of the gear shaft 48) an actuator or motor (not shown). A gear spacer 60 can provide support to the gear shaft 48 and help maintain its alignment. A gland 58 can provide a liquid-tight and gas-tight seal between the gear shaft 48 and the outlet ring 16. Rotation of the gear shaft 48, through interaction of the gear shaft teeth (not shown) with the gear rack teeth 47, rotates the gear rack 47 and the actuation ring 34 about a central axis 10 of the nozzle assembly 12, which is also the center axis of the actuation ring 34. It is conceived that the center axis of the actuation ring 34 be offset radially from the central axis 10, for instance, if necessary to adapt the nozzle assembly 12 to connect and work with an existing turbine.

When the actuation ring 34 rotates, the axes of the pivot pins 36 and the respective holes 28 move rotationally around the central axis 10 along with the actuation ring 34. The rotational movement of the vanes 14 along with the actuation ring 34, with respect to the stationary guides 30 and the outlet ring 16, causes the vanes 14 to rotate and the slots 22 to slide on the guides 30.

In an alternate embodiment, the slot 22 can be in the tail end 18, while the hole 28 can be in the head end 24. The nozzle assembly 12 can be modified accordingly, particularly including the pivot pins 36 and guides 30. In this alternative embodiment, the guides 30 can function as, or be modified to function as pivot pins. Likewise, the pivot pins 36 can function as, or be modified to function as guides. When the actuation ring 34 rotates, the pivot pins 36 functioning (or modified to function) as guides move with the actuation ring 34, causing the vanes 14 to slide on the pivot pins 36 functioning (or modified to function) as guides. Also, the vanes 14 rotate about the holes 28 and the guides 30 functioning (or modified to function) as pivot pins.

In practical application, the need to adjust the nozzles 26 is dictated by external variables, such as a demand for power, changing input from the fuel source, a natural variation in the supply pressure, and so forth. Methods and means to detect external variables and operate a motor based on the external variable using a digital microprocessor, microcontroller, or other programmable controller are known.

It is important to seal the nozzle assembly 12 properly in order to maintain pressure integrities and restrict influent flow to the desired path through the nozzle assembly 12. As such, appropriate seals are used. For instance, the gland 58 provides one such seal. An O-ring or other seal can also be used to seal around each of the guide pins 30, for instance, if the guide pins 30 extend all the way through the inlet ring 20 or the outlet ring 16. Other seals and sealing mechanisms can be used as are known in the art and/or would be recognized by one skilled in the art.

The terminology used herein is for the purpose of description, not limitation. Specific structural and functional details disclosed herein are not to be interpreted as limiting, but merely as a basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention. Therefore, it is intended that the present disclosure not be limited to the particular embodiment(s) disclosed as, but that the disclosure will include all embodiments falling within the scope of the appended claims.

We claim:

1. A nozzle assembly for adjusting a radial inflow turbine, the nozzle assembly comprising:
    a gas inlet ring;
    a gas outlet ring spaced apart from the gas inlet ring and opposing the gas inlet ring;
    an actuation ring having a central axis about which the actuation ring is rotatable with respect to the inlet ring and the outlet ring;
    a plurality of guides connected to at least one of the gas inlet ring, the gas outlet ring, and the actuation ring, wherein the guides function as pivot pins; and
    a plurality of nozzle vanes circumferentially spaced and disposed between the gas inlet ring and the gas outlet ring, each nozzle vane rotatable about a vane pivot axis with respect to the gas inlet ring and the gas outlet ring, and each nozzle vane in sliding engagement with a respective guide from the plurality of guides.

2. The nozzle assembly of claim 1, wherein a vane from the plurality of nozzle vanes has a slot that receives and engages a guide from the plurality of guides.

3. The nozzle assembly of claim 2, wherein the actuation ring is connected to a guide of the plurality of guides and the actuation ring moves a guide of the plurality of guides in the slot to rotate the nozzle vane about the vane pivot axis.

4. The nozzle assembly of claim 1, wherein each guide from the plurality of guides is one of a bolt, a stud, and a pin.

5. A nozzle assembly for adjusting a radial inflow turbine, the nozzle assembly comprising:
    a gas inlet ring;
    a gas outlet ring spaced apart from the gas inlet ring and opposing the gas inlet ring;
    an actuation ring having a central axis about which the actuation ring is rotatable with respect to the inlet ring and the outlet ring, wherein the actuation ring is connected to each nozzle vane at the vane pivot axis;
    a plurality of guides connected to at least one of the gas inlet ring, the gas outlet ring, and the actuation ring; and
    a plurality of nozzle vanes circumferentially spaced and disposed between the gas inlet ring and the gas outlet ring, each nozzle vane rotatable about a vane pivot axis with respect to the gas inlet ring and the gas outlet ring, and each nozzle vane in sliding engagement with a respective guide from the plurality of guides.

6. The nozzle assembly of claim 5, further comprising:
    a gear rack attached to the actuation ring; and
    a gear shaft extending through the outlet ring, the gear shaft comprising a pinion engageable with the gear rack.

7. The nozzle assembly of claim 6, wherein a gland seals between the gear shaft and the outlet ring.

8. The nozzle assembly of claim 6, wherein a spacer encircles the gear shaft within the outlet ring.

9. The nozzle assembly of claim 5, wherein the inlet ring and the outlet ring are spaced apart by at least one spacer.

10. The nozzle assembly of claim 9, wherein the at least one spacer encircles the guide within the slot of at least one vane of the plurality of nozzle vanes.

11. The nozzle assembly of claim 5, wherein the actuation ring further comprises a plurality of cutouts, and wherein the nozzle assembly further comprises a plurality of rollers, each roller from the plurality of rollers rotatable about a roller axis and positioned in one cutout from the plurality of cutouts in order to provide support and stabilization of the actuation ring during rotation of the actuation ring.

12. The variable nozzle system of claim 5, wherein the actuation ring further comprises a plurality of cutouts, and wherein the variable nozzle system further comprises a plurality of rollers rotatable about a roller axis and positioned in one cutout from the plurality of cutouts in order to provide support and stabilization of the actuation ring during rotation of the actuation ring.

13. A variable nozzle system for a radial inflow turbine, the variable nozzle system comprising:
    a first mounting ring;
    a second mounting ring spaced apart from the first mounting ring and opposing the first mounting ring;

a plurality of vanes circumferentially spaced between the first mounting ring and the second mounting ring, each vane having a pivot point around which each vane is rotatable to adjust a plurality of nozzles, each nozzle from the plurality of nozzles defined on four sides by the first mounting ring, the second mounting ring, and two vanes from the plurality of vanes;

an actuation ring having a central axis about which the actuation ring is rotatable with respect to the first mounting ring and the second mounting ring, the actuation ring being engaged with each nozzle vane from the plurality of nozzle vanes to drive the rotation of each nozzle vane;

a gear rack attached to the actuation ring; and a gear shaft extending through the second mounting ring, the gear shaft comprising a pinion engageable with the gear rack.

14. The variable nozzle system of claim 13, further comprising a plurality of guides, each guide extending from one of the first mounting ring, the second mounting ring, and the actuation ring, and each guide engaging a respective vane from the plurality of vanes to direct the rotation of each vane.

15. The variable nozzle system of claim 13, wherein the actuation ring is connected to each vane of the plurality of vanes at the pivot point.

16. The variable nozzle system of claim 13, wherein a gland seals between the gear shaft and the second mounting ring.

17. The variable nozzle system of claim 13, wherein a spacer encircles the gear shaft within the second mounting ring.

18. The variable nozzle system of claim 13, wherein each guide from the plurality of guides is one of a bolt, a stud, and a pin.

19. The variable nozzle system of claim 13, wherein the first mounting ring and the second mounting ring are spaced apart by at least one spacer.

20. The variable nozzle system of claim 18, wherein the at least one spacer encircles a guide within the slot of at least one vane of the plurality of nozzle vanes.

\* \* \* \* \*